US011002000B2

(12) United States Patent
Ellis et al.

(10) Patent No.: US 11,002,000 B2
(45) Date of Patent: May 11, 2021

(54) GRAVITATIONAL SEPARATOR PROVIDING ENHANCED CONTAMINANT SEPARATION

(71) Applicants: Stuart C. Ellis, Apison, TN (US); Eric B. Rominger, Hixson, TN (US); J. Kelly Williamson, Hixson, TN (US)

(72) Inventors: Stuart C. Ellis, Apison, TN (US); Eric B. Rominger, Hixson, TN (US); J. Kelly Williamson, Hixson, TN (US)

(73) Assignee: AquaShield, Inc., Chattanooga, TN (US)

( * ) Notice: Subject to any disclaimer, the term of this patent is extended or adjusted under 35 U.S.C. 154(b) by 0 days.

(21) Appl. No.: 16/873,338

(22) Filed: Mar. 23, 2020

(65) Prior Publication Data

US 2020/0308820 A1 Oct. 1, 2020

Related U.S. Application Data

(60) Provisional application No. 62/919,727, filed on Mar. 26, 2019.

(51) Int. Cl.
| | |
|---|---|
| *E03F 5/14* | (2006.01) |
| *E03F 5/16* | (2006.01) |
| *B01D 21/00* | (2006.01) |
| *B01D 21/24* | (2006.01) |
| *B01D 21/26* | (2006.01) |
| *E03F 5/10* | (2006.01) |

(52) U.S. Cl.
CPC ............ *E03F 5/16* (2013.01); *B01D 21/0042* (2013.01); *B01D 21/0087* (2013.01); *B01D 21/2411* (2013.01); *B01D 21/2444* (2013.01); *B01D 21/265* (2013.01); *E03F 5/101* (2013.01); *E03F 5/14* (2013.01)

(58) Field of Classification Search
CPC . E03F 5/0403; E03F 5/101; E03F 5/14; E03F 5/16; B01D 21/0042; B01D 21/0087; B01D 21/2411; B01D 21/2444; B01D 21/265
USPC ..... 210/170.03, 519, 521, 532.1, 538, 747.2
See application file for complete search history.

(56) References Cited

U.S. PATENT DOCUMENTS

| | | | |
|---|---|---|---|
| 1,651,246 A | 11/1927 | Bell | |
| 2,068,140 A | 1/1937 | Jaquith | |
| 4,985,148 A | 1/1991 | Monteith | |
| 5,759,415 A * | 6/1998 | Adams | E03F 5/14 210/519 |
| 6,264,835 B1 * | 7/2001 | Pank | E03F 5/16 210/170.03 |
| 6,524,473 B2 | 2/2003 | Williamson | |

(Continued)

*Primary Examiner* — Christopher Upton
(74) *Attorney, Agent, or Firm* — Michael E. McKee

(57) ABSTRACT

A gravitational separator for a drainage system includes a collection cavity within which drainwater is collected. The collection cavity includes an exit; and a baffle is strategically arranged within the collection cavity for isolating a boundary region of the cavity interior from the central region thereof and for directing the flow of drainwater which moves through the boundary region along a desired flow path. In addition, an outlet control structure is disposed over the mouth of the exit and includes a sidewall having an opening through which drainwater which enters the mouth of the exit must enter so that as the drainwater enters the sidewall opening and moves into the mouth of the exit opening, the direction of flow of the drainwater is altered through at least 90 degrees.

20 Claims, 4 Drawing Sheets

(56) References Cited

U.S. PATENT DOCUMENTS

| | | | |
|---|---|---|---|
| 6,730,222 B1 | 5/2004 | Andoh et al. | |
| 6,951,619 B2 * | 10/2005 | Bryant | E03F 5/14 |
| | | | 210/532.1 |
| 7,296,692 B2 | 11/2007 | Allen, II et al. | |
| 7,344,636 B2 | 3/2008 | Faram et al. | |
| 8,746,463 B2 | 6/2014 | Cobb et al. | |
| 8,900,448 B2 | 12/2014 | Fink et al. | |
| 2006/0283814 A1 * | 12/2006 | Williamson | B01D 21/265 |
| | | | 210/787 |
| 2007/0012608 A1 * | 1/2007 | Su | E03F 5/14 |
| | | | 210/170.03 |
| 2011/0049029 A1 * | 3/2011 | Pank | E03F 5/14 |
| | | | 210/170.03 |

* cited by examiner

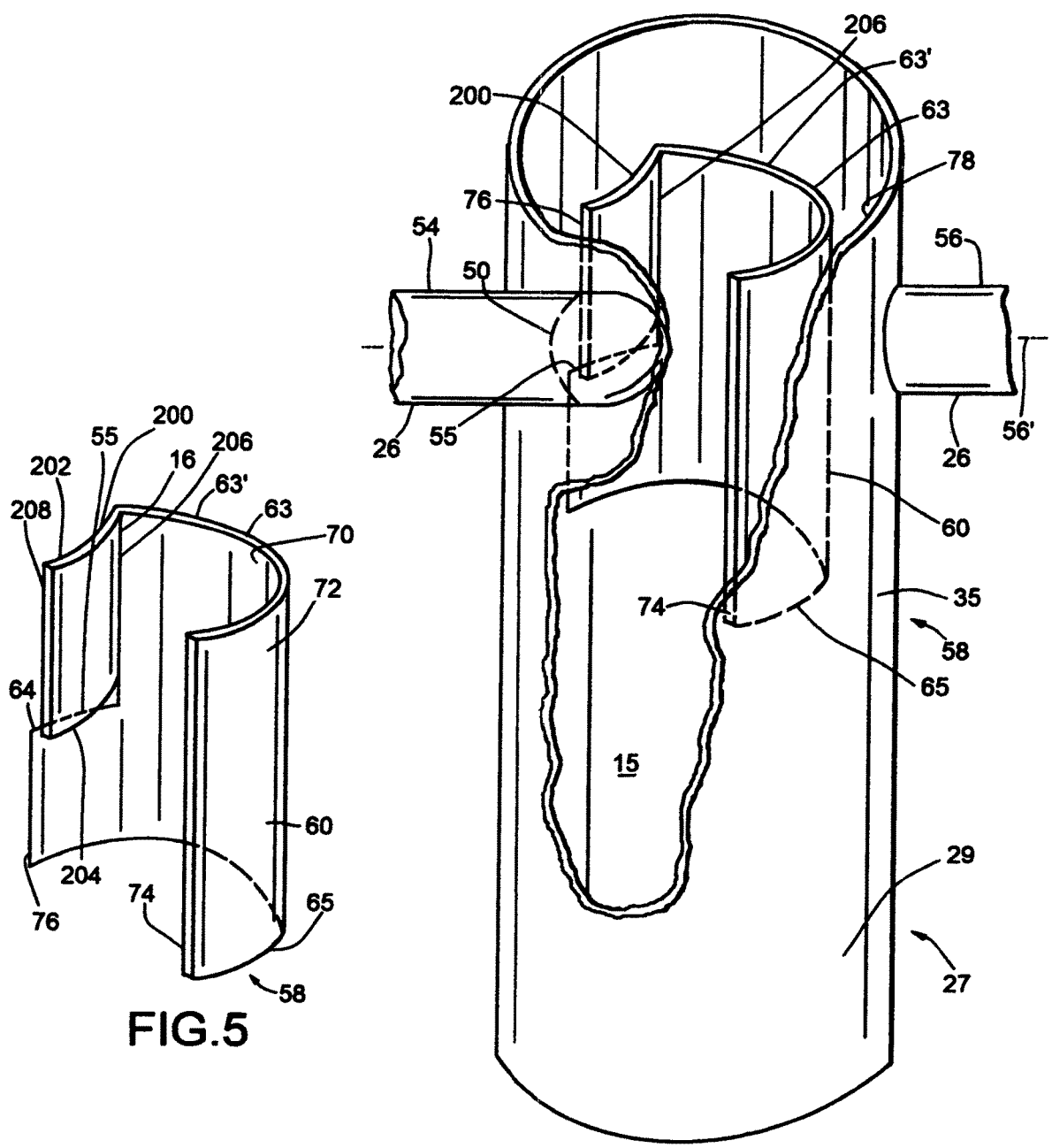
FIG.5
FIG.6
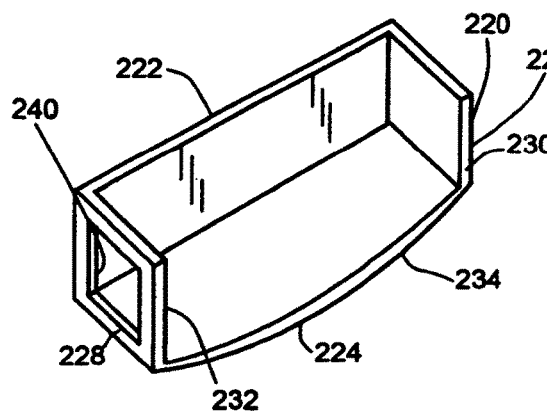
FIG.7

GRAVITATIONAL SEPARATOR PROVIDING ENHANCED CONTAMINANT SEPARATION

The benefit of Provisional Application Ser. No. 62/919,727, filed Mar. 26, 2019 and entitled GRAVITATIONAL SEPARATOR PROVIDING ENHANCED CONTAMINANT SEPARATION, is hereby claimed. The disclosure of this referenced provisional application is incorporated herein by reference.

BACKGROUND OF THE INVENTION

This invention relates generally to the separation of contaminants, such as course sediment and debris, from water which passes through piping and relates, more particularly, to catch basins or other gravitational separators into which water, such as drainwater, is routed for the purpose of separating course sediment, debris and other contaminants from the water.

It is known that course sediment, debris, and the residue from oil and gasoline spills at service stations, parking lots or similar sites commonly remains at or accumulates at a site until it is washed away with water by way of a rainfall or a hose-cleaning operation. Of course, as the sediment, debris or residue is washed to a drain, it is likely to be carried to and mixed with the water supply (e.g. lakes, etc.) from which drinkable water is taken. Similar problems and environmental concerns arise at alternative sites, such as in a leaching pool designed as a detention basin, for filtering, for example, wastewater, stormwater, free-phased organics, petroleum spills, nonpoint source discharge water, vehicle washdown wastewater, wastewater from secondary containment dikes, evacuation and construction sites, underground storage tank removals, emergency response conditions, remote wash down areas, and captured water at stream crossings for timber cutting sites.

The class of gravitational separators to which this invention is to be compared includes a collection cavity having substantially circular sidewalls and an elevated inlet opening which is connectable to an upstream pipe portion at an angle with respect to the sidewalls so that drainwater which enters the collection cavity through the elevated inlet opening imparts a swirling motion (e.g. a circular, rotational or vortex motion) to drainwater collected within the collection cavity. In addition, a baffle is supported within the collection cavity adjacent an elevated exit opening of the separator for isolating the exit opening from swirling motion of the drainwater present within the collection cavity yet permit drainwater to exit the cavity through the exit opening when the level of drainwater collected within the collection cavity reaches the level of the elevated exit opening.

An example of a gravitational separator of the aforedescribed class is shown and described in U.S. Pat. No. 6,524,473.

It would be desirable to provide a new and improved gravitational separator for separating course sediment, debris or other unwanted contaminants from drainwater which is washed into a drainage system.

Accordingly, it is an object of the present invention to provide a new and improved gravitational separator of the aforescribed class into which drainwater is routed when conducted along a drainage system.

Another object of the present invention is to provide such a separator having an improved capacity for separating course sediment, debris or other unwanted contaminants from drainwater which enters the separator.

Still another object of the present invention is to provide such a separator whose construction effects an alteration in the flow pattern of drainwater moving through the interior of the separator and wherein the performance of the separator is enhanced by such an alternation in the drainwater flow pattern.

A further object of the present invention is to provide such a separator which is easily serviceable and is particularly well-suited for use with a filtration system through which drainwater which enters a storm drain is directed for the purpose of filtering the drainwater.

A still further object of the present invention is to provides such a separator which is uncomplicated in construction and effective in operation.

SUMMARY OF THE INVENTION

This invention resides in a gravitational separator positionable within a drainage system having an upstream pipe portion having an outlet through which drainwater enters the separator and a downstream pipe portion having an inlet through which drainwater exits the separator.

The gravitational separator includes an interior, substantially circular sidewalls which encircle the interior, a bottom, an entrance opening through which drainwater enters the collection cavity from the upstream pipe portion, and an exit opening through which drainwater exits the collection cavity and which has a mouth and is connectable to the downstream pipe portion. The interior includes a central region within which drainwater is collected and a boundary region, and wherein the entrance and exit openings are disposed in an elevated and spaced condition above the bottom. The collection cavity is connectable to the upstream pipe portion at such an angle with respect thereto so that drainwater which enters the collection cavity through the entrance opening thereof is directed by the upstream pipe portion substantially tangentially along the inside surface of the sidewalls to impart a swirling motion to the drainwater collected within the central region of the collection cavity.

In addition, a baffle is supported within the collection cavity for isolating the exit opening and the boundary region of the collection cavity interior from the central region thereof and from swirling motion of drainwater collected within the central region yet permit drainwater to exit the collection cavity interior through the exit opening when the level of drainwater collected within the collection cavity interior reaches the level of the exit opening, and the baffle has a lower edge which is spaced from the bottom of the collection cavity and extends across the collection cavity.

Furthermore, an outlet control structure is positioned within the cavity interior and across the mouth of the exit opening and including a sidewall having a sidewall opening through which drainwater which enters the mouth of the exit opening must enter so that as the drainwater enters the sidewall opening and moves into the mouth of the exit opening, the direction of flow of the drainwater is altered through at least 90 degrees.

BRIEF DESCRIPTION OF THE DRAWINGS

FIG. 5 is a perspective view of the arcuate baffle and inlet flow control panel componentry of the FIG. 1 separator.

FIG. 6 is a perspective view of the FIG. 1 separator, shown partially cut-away, showing the baffle and inlet flow control panel secured to the separator sidewalls.

FIG. 7 is a perspective view of the outlet control structure of the FIG. 1 separator.

DETAILED DESCRIPTION OF AN ILLUSTRATIVE EMBODIMENT

Figure 1:
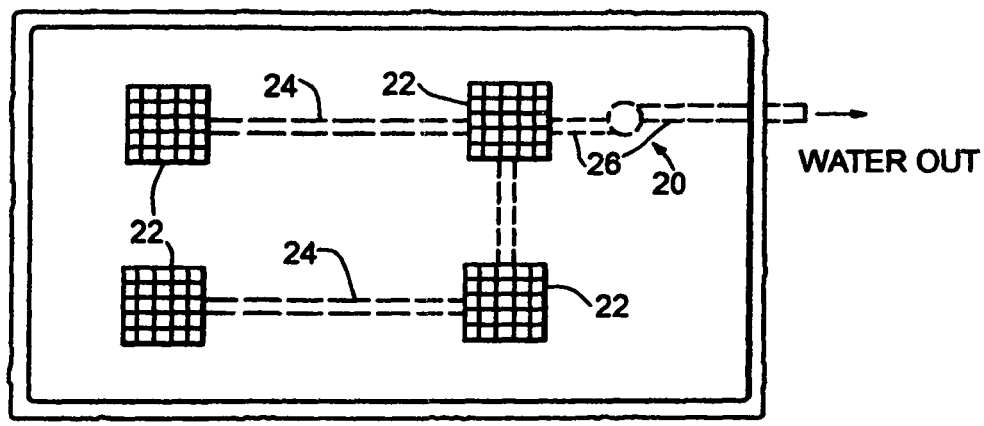
FIG. 1 is a plan view of an environment within which an embodiment of a gravitational separator is employed.

Turning now to the drawings and considering first FIGS. 1-4, there is illustrated an embodiment, generally indicated 20, of a hydrodynamic gravitational separator within which features of the present invention are embodied. The depicted separator 20 is designed for use in an application, such as depicted in plan view in FIG. 1, wherein several surface drains 22 are connected with appropriate (underground) drain piping 24 to accommodate the flow of drainwater from the several surface drains 22 toward a single discharge point. The drain piping 24 includes a single, substantially horizontally-oriented convergence drain pipe 26 through which the drainwater flows from each of the surface drains 22, and the separator embodiment 20 is installed in this drain pipe 26.

Although the depicted separator 20 is described herein in an underground installation, a separator embodying features of the present invention can be incorporated in an industrial or above-ground installation (such as, for example, within an elevated floor of a multi-level parking garage). Accordingly, the principles of the present invention can be variously applied.

As will be apparent herein, the separator 20 is constructed so that a swirling motion is imparted to drainwater, or stormwater, entering the separator interior but ensures that in order for the drainwater to exit the separator interior, its direction of flow is substantially (and abruptly) altered through multiple coordinate axes (i.e. three) from an initially-induced direction of drainwater swirl. Stated another way, the construction of the separator 20 effects advantageous alterations in the flow pattern of drainwater moving through the interior of the separator 20, and such alterations in the drainwater flow pattern aids the separator 20 in its capacity to remove sediment and debris from the drainwater and thereby improves upon the performance of the separator 20.

With reference again to FIGS. 1 and 2, the horizontally-oriented drain pipe 26 is opened at two locations along its length, and the separator 20 includes means, generally indicated 27, for defining a flow, or collection, cavity 29 through which drainwater is permitted to flow and which is connected in flow communication with the drain pipe 26 by way of the opened locations. In particular, a first, or entrance, opening 30 is formed along the length of the drain pipe 26, a second, or outlet opening 32 is formed along the length of the drain pipe 26 downstream of the first location 30, and the collection cavity 29 is connected between the openings 30 and 32 so that the flow of drainwater moving through the drain pipe 26 is routed through the cavity-defining means 27. In other words, the cavity-defining means 27 is connected in such a flow relationship to the drain pipe 26 that the drainwater which flows along the drain pipe 26 is routed into the cavity-defining means 27 by way of the entrance opening 30 and is returned to the drain pipe 26 from the cavity-defining means 27 by way of the outlet opening 32. Furthermore, the outlet opening 32 has a mouth 31 (FIG. 4) at the entrance thereof.

Although the cavity-defining means 27 of the separator 20 can be constructed of a number of materials, such as fiberglass-reinforced plastic (FRP) or steel or concrete, for providing circular sidewalls 35 and a substantially planar and horizontally-disposed bottom 37 of the cavity 29, the depicted separator 20 is fabricated of polymer coated steel (PCS) which promotes a long, useful life of the separator 20. In the alternative, the separator 20 can be fabricated out of durable high-density polyethylene (HDPE) materials. In either event, the materials comprising the depicted separator 20 are preferably relatively light in weight so that the separator 20 can normally be off-loaded at a jobsite in a fully assembled condition without the need for special lifting equipment, such as a crane. Thus, the depicted separator 20 accommodates relatively easy on-site handling and installation.

Figure 2:
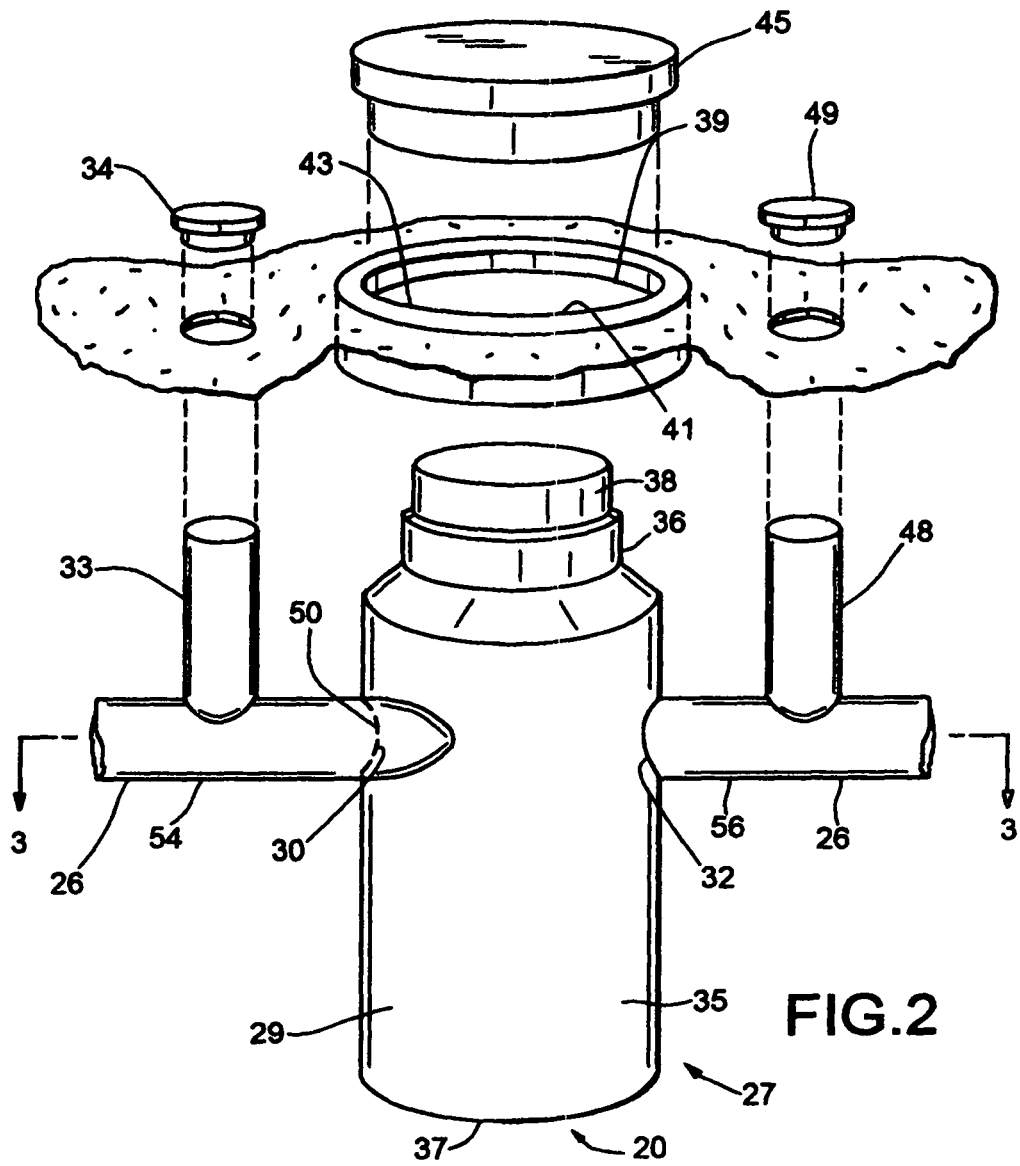
FIG. 2 is a perspective view of the FIG. 1 separator.

As best shown in FIG. 2, the sidewalls 35 of the cavity 29 extend substantially vertically (i.e. upwardly) from the bottom 37 thereof to a riser 39 within which a frame 41 for supporting a manhole cover 45 is positioned. If desired, the riser 39 can be incorporated within, or comprise an upper portion, of the separator 20 and extend upwardly to a surface opening. The frame 41 defines a central opening 43, and the manhole cover 45 is positioned atop the frame 41 so as to cover the opening 43. When the cavity-defining means 27 is connected to the drain pipe 26 for operation, the cavity-defining means 27 lies buried beneath the surface of the ground yet is accessible through the central opening 43 of the cover-supporting frame 41. Until access into the interior of the cavity-defining means 27 is required, the central opening 43 can remain covered by the manhole cover 45. If desired, the separator 20 can include cylindrical sections 36, 38 of reduced diameter which are joined to so as to extend axially upwardly from the cavity-defining means 27 adjacent the top thereof.

It is a feature of the separator 20 that its cavity-defining means 27 includes an entrance opening 50 (FIG. 3) which is connectable to the drain pipe 26 by way of the first opening 30 defined therein and an exit opening 52 which is connectable to the drain pipe 26 by way of the second opening 32. Furthermore, the entrance and exit openings 50 and 52 of the cavity-defining means 27 are disposed in an elevated and spaced condition above the bottom 37—which elevation is indicated 53 in FIG. 4, of the cavity-defining means 27 to provide the interior, indicated 46, of the cavity 29 with a collection volume of substantial size into which debris and large sediment is permitted to fall and collect from the drainwater which enters the cavity-defining means 27. Moreover, the entrance and exit openings 50 and 52 are disposed at about the same elevation, or level, with one another and on opposite sides of the cavity-defining means 27, but alternative relative dispositions between the entrance and exit openings 50 and 52 can be had. In order that the drainwater be permitted to flow freely through the cavity-defining means 27 (and thus prevent a backlog of drainwater therein), it is preferable that the exit opening 52 be disposed at an elevation which is no higher than that of the entrance opening 50.

Within the depicted environment of FIGS. 1 and 2, the drain pipe 26 includes an upstream pipe segment 54 disposed upstream of the separator 20 and a downstream pipe segment 56 disposed downstream of the separator 20. To provide access to the interior of the upstream pipe segment 54 of the drain pipe 26 for purposes of inspection and/or clean-out, a manway conduit 33 (FIG. 2) is joined to the upstream pipe segment 54 so as to extend upwardly therefrom, and a manhole cover 34 is positioned across so as to cover the mouth of the manway conduit 33. Similarly and to provide access to the interior of the downstream pipe segment 56 of the drain pipe 26 for purposes of inspection and/or clean-out, a manway conduit 48 is joined to the downstream pipe segment 56 so as to extend upwardly therefrom, and a manhole cover 49 is positioned across so as to cover the mouth of the manway conduit 48. For a more detailed description of the manway conduits 33 and 43 associated with the upstream and downstream pipe segments 54 and 56, reference can be had to U.S. Pat. No. 6,524,473, the disclosure of which is incorporated herein by reference.

It is a feature of the separator 20 that the upstream pipe segment 54 is disposed in such a relation to the cavity-defining means 27 so that drainwater which enters the cavity-defining means 27 through the entrance opening 50 is directed substantially tangentially (and horizontally) along the inside surface of the sidewalls 35 to impart a swirling, or circular, motion to drainwater entering the opening 50 and collected within the upper region 96 (FIG. 4) of the interior 46 of the collection cavity 29. The direction of flow of this imparted swirling motion is depicted with the arrows 18 in FIG. 3—which arrows 18 are shown in FIG. 3 as moving in a counter-clockwise direction.

Figure 3:
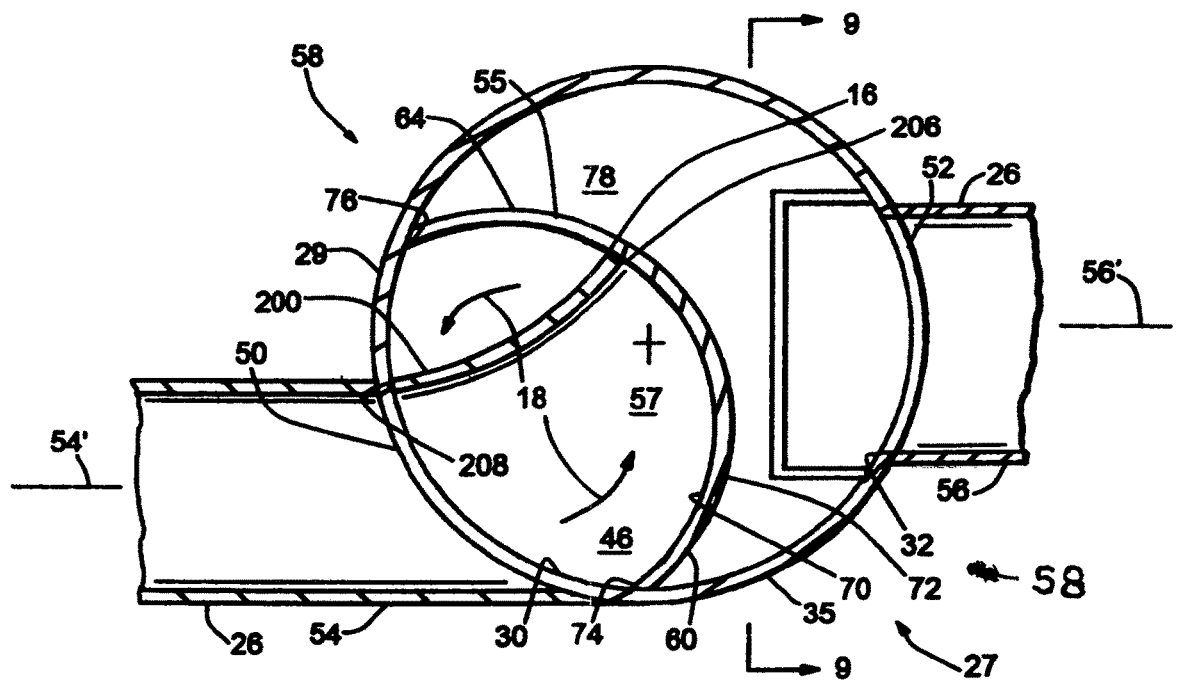
FIG. 3 is a cross-sectional view of the FIG. 1 separator taken along line 3-3 of FIG. 2.

In order to impart such a swirling motion to the drainwater entering the cavity-defining means 27 and as best shown in FIG. 3, the upstream pipe segment 54 is joined to the entrance opening 50 of the cavity-defining means 27 so that the longitudinal axis, indicated 54', of the upstream pipe segment 54 is disposed to one side of, and parallel to, the longitudinal axis, indicated 56', of the downstream pipe segment 56 so that drainwater which enters the cavity 29 through the opening 50 is directed tangentially along the inside surface of the cavity sidewalls 35.

Figure 4:
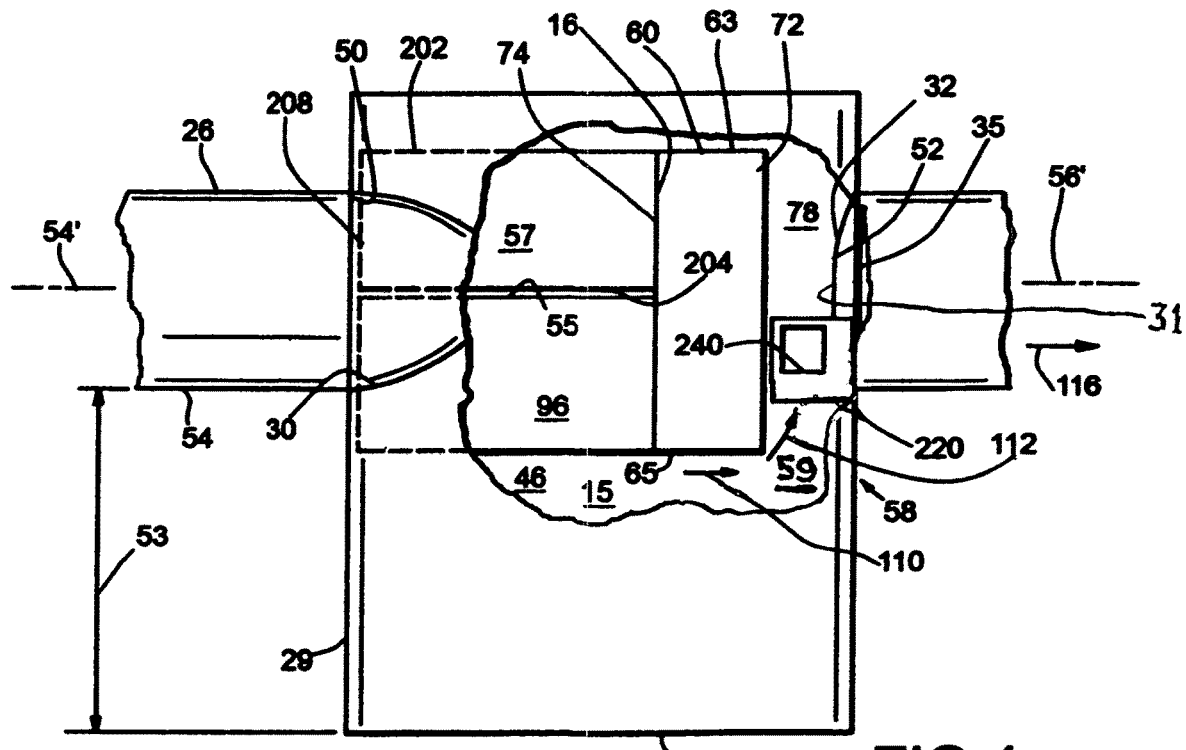
FIG. 4 is a side elevation view of the FIG. 1 separator as seen from below in FIG. 3, shown partially cut-away.

As best shown in FIG. 3, the interior 46 of the collection cavity 29 includes a central region 57 (or swirl chamber) which extends upwardly from the cavity bottom 37 from about the center thereof, and the separator 20 includes an arcuate-shaped baffle, generally indicated 58 in FIGS. 3-5, disposed within the interior 46 of the collection cavity 29 adjacent the exit opening 32 which, among other things, serves to isolate the exit opening 32 from the swirling motion of the drainwater present within the central region 57 of the collection cavity 29 yet permit drainwater to exit the collection cavity 29 when the level of the drainwater collected within the collection cavity 29 rises to the elevation, or level, of the exit opening 32. Stated another way, the interior of the cavity 29 includes a boundary region 59 (FIG. 4) disposed immediately upstream of the exit opening 32 and along an adjacent sidewall 35, and the baffle 58 effectively separates the boundary region 59 from the central region 57 of the cavity 29.

Within the depicted embodiment 20 and with reference to FIGS. 3-6, the baffle 58 includes a plate 60 of relatively thin construction and which is formed (e.g. bent) into an arcuate shape so as to provide the plate 60 with a C-shaped cross section (as shown in the horizontal cross-sectional view of FIG. 3) having an inner surface 70 and an outer surface 72 and two opposite, vertically-disposed (side) edges 74, 76 which are sealingly joined to the interior surface of the sidewalls 35 along locations (i.e. along substantially vertically-oriented paths) disposed on opposite sides of the entrance opening 50 so that a spacing 78 is provided between the outer surface 72 of the baffle plate 60 and the adjacent sidewalls 35. It is within this spacing 78 that the aforementioned boundary region 59 of the collection cavity 29 is defined. In addition, the swirling motion which is imparted to drainwater which enters the collection cavity 29 through the entrance opening 50 thereof is encouraged, or promoted by, rather than hampered, by the arcuate shape of the baffle plate 60.

Furthermore and as best shown in FIG. 4, the plate 60 of the baffle 58 defines a substantially horizontally-disposed upper and lower edges 63, 65, respectively, which are disposed adjacent the upper and lower regions of the aforementioned spacing 78. A major segment, indicated 63' in FIG. 5, of the upper edge 63 extends to a location disposed adjacent the top of the cavity-defining means 27, and there is provided along the upper edge 63 a cutout 64 defining an upper edge 55 which is disposed at about the same (horizontal) level of the center of the entrance opening 50 (FIGS. 2, 4 and 6) of the collection cavity 29. The upper edge 55 of the cutout 64 is joined to the major section 63' of the upper edge 63 by way of a substantially vertically-disposed edge 16 (FIGS. 3 and 5) defined in the baffle plate 60 and adjacent the cutout 64.

Meanwhile, the lower edge 65 of the baffle plate 60 is disposed at an appreciable distance beneath the upper edge 63 yet is spaced from the bottom 37 of the collection cavity 29. Within the depicted embodiment 20, the lower edge 65 of the baffle plate 60 is disposed slightly above an elevation located about one-half way between the center of the inlet opening 50 and the bottom 37 of the cavity 29 so as to define a lowermost region, indicated 15 in FIG. 4, of the collection cavity 29 disposed between the lower edge 65 of the baffle 58 and the bottom 37 of the collection cavity 29. During operation of the separator 20, drainwater which enters the central region 57 (FIG. 3) of the collection cavity 29 is induced to swirl relatively rapidly in a counter-clockwise direction therein by virtue of the (reduced) diameter of the central region 57 in the vicinity of the baffle 58. However, upon passage of the drainwater downwardly from the central region 57 and into the lowermost region 15, the velocity of the drainwater is reduced, or slowed, considerably by virtue of the increased diameter of the lowermost region 15 (relative to that of the central region 57). This slowing down, or reduction in velocity, of the drainwater entering the lowermost region 15 from the central region 57 is believed to further enhance the separation of sediment from the drainwater flowing through the separator 20.

In addition and with reference to FIGS. 3 and 5, there is associated with the baffle 58 a vertically-disposed flow control panel 200 of arcuate form (as seen in the plan view of FIG. 3) and having upper and lower edges 202, 204, respectively, and two opposite side edges 206, 208. One side edge 208 is joined in sealing relationship to the sidewalls 35 along a substantially vertical path disposed adjacent the entrance opening 50, and the other side edge 206 is joined in sealing relationship to the (inner surface 70 of) the baffle plate 60 along a substantially vertical path extending therealong or, more specifically, along the baffle edge 16 disposed adjacent the cutout 64. In practice, this flow control panel 200 provides structural support for the baffle 58 and, during high flow rate conditions, helps to prevent the passage of floating debris (e.g. Styrofoam cups) from passing out of the central region 59 of the separator 20 through the baffle cutout 64. In other words and during high flow (e.g. storm flow) rate conditions, the flow control panel 200 acts as a vertically-disposed partition which inhibits the passage of floating debris from passing out of the central region 57 of the collection cavity 29 and into the boundary region 78 thereof. During common, or lower flow, rate conditions, the flow control panel 200 does not inhibit the induced swirling, or counter-clockwise (as viewed in FIG. 3), motion of the drainwater entering the collection cavity 29 by way of the entrance opening 50 thereof.

It is a feature of the separator 20 that in order for drainwater to pass upwardly from the lowermost region 15 of the collection cavity 29 and into the spacing 78 disposed between the baffle plate 60 and the sidewalls 35, the drainwater must pass underneath the lower edge 65 of the baffle 60. In particular and as drainwater passes beneath the lower edge 65 of the baffle 60 and into the spacing 78, the drainwater must flow in a somewhat radially-outwardly direction with respect to the cavity interior 46 and substantially along the direction indicated by the flow arrow 110 in FIG. 4. Thereafter and as the drainwater flows upwardly into the spacing 78 from the lowermost region 15 of the collection cavity 29 and as best shown in FIGS. 4 and 9, the drainwater flows along a substantially vertical path, indicated by the direction arrow 112.

Figure 8:
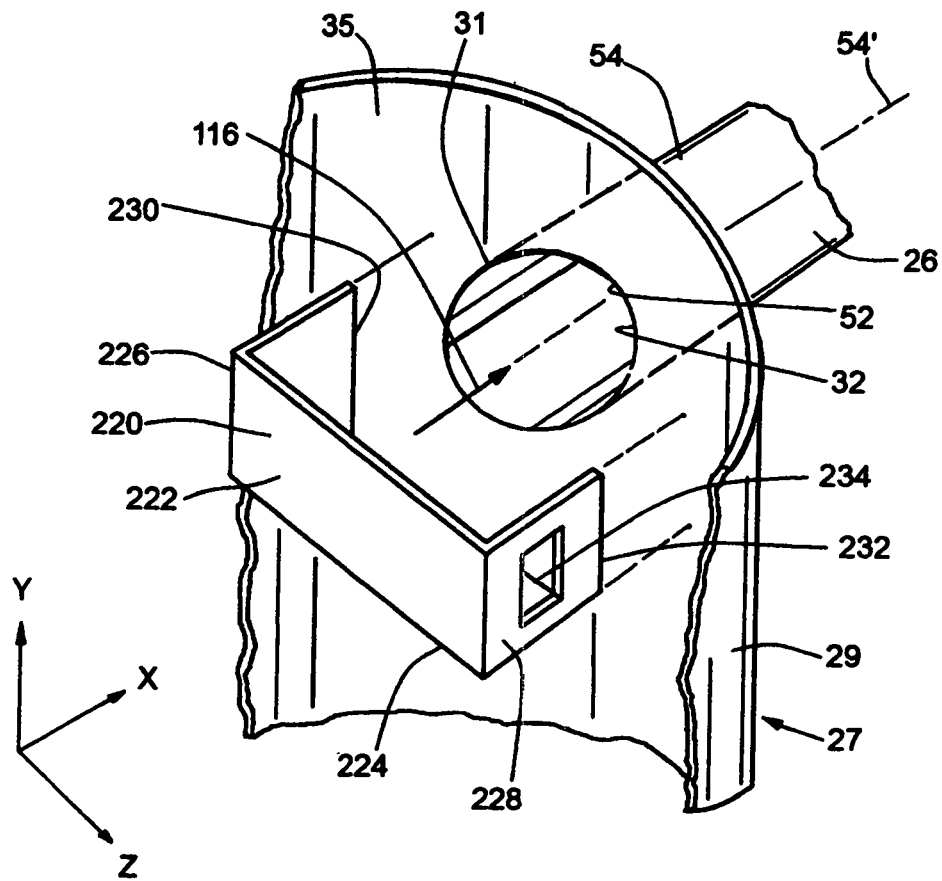
FIG. 8 is a perspective view of a fragment of the FIG. 1 separator and the outlet control structure of FIG. 7, shown exploded.
Figure 9:
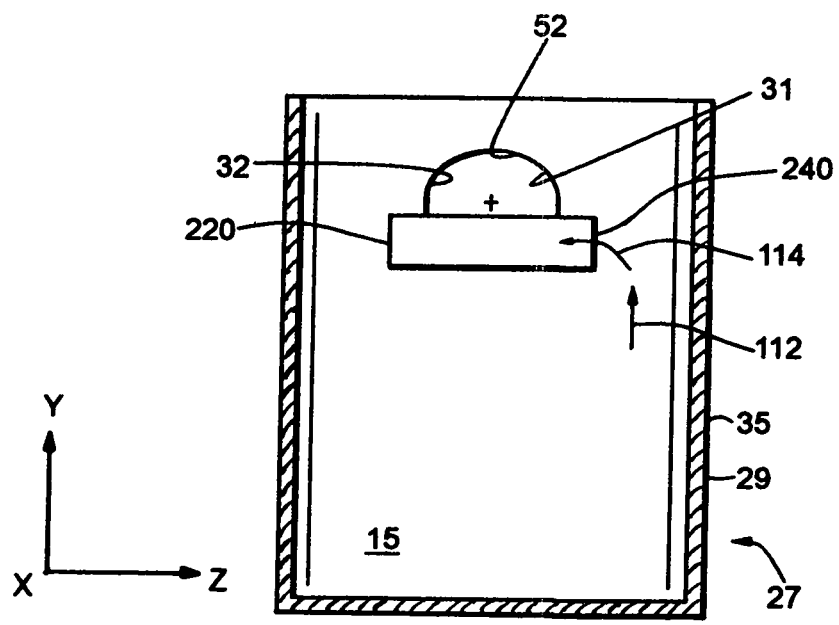
FIG. 9 is a longitudinal cross-sectional view of the FIG. 1 separator taken about along line 9-9 of FIG. 3 and depicting the directions of drainwater flow through the boundary region of the separator.

With reference to FIGS. 7-9, it is also a feature of, the separator 20 that it includes an outlet control structure 220 for preventing drainwater from flowing from the spacing 78 and into the outlet opening 52 unless it flows into the exit opening 52 from a particular direction and with regard to the direction of drainwater entering the spacing 78 moving, or swirling, within the central region 57 of the collection cavity 29. In other words and within the depicted separator 20, drainwater is prevented from passing from the spacing 78 and into the exit opening 52 unless the direction of drainwater flow is altered through a relatively tortuous path of travel which extends between the substantially horizontal and counter-clockwise direction of flow (indicated by the FIG. 3 flow arrows 18) when the drainwater enters the collection cavity 29 by way of the entrance opening 50 and the direction of drainwater flow immediately and in front of the outlet opening 52. Moreover and since the depicted FIG. 4 counter-clockwise direction is imparted to the drainwater flow through the central region 57, it could also be said that the outlet control structure 220 is configured (i.e. provided with a sidewall opening 240 described therein) with regard to the direction of drainwater entering the collection cavity 29.

In connection with the foregoing and as best shown in FIGS. 7 and 8, the outlet control structure 220 is in the form of a rectangular prism (e.g. a box-like structure) including a front wall 222, a bottom wall 224 and two opposite sidewalls 226, 228 which are joined together along corners of the rectangular form of the structure 220. Moreover, each sidewall 226 or 228 includes a linear rearward edge 230 or 232, respectively, and the bottom wall 224 defines an accurate rearward edge 234 which are joined to the sidewalls 35 of the cavity-defining means 27 about the mouth 31 of the outlet opening 32. More specifically, the sidewall edges 230 and 232 are secured to the sidewalls 35 so as to be disposed on opposite sides of the mouth 31 of the exit opening 32 and along parallel paths which extend substantially vertically along the sidewalls 35; and the arcuate rearward edge 234 of the bottom wall 224 is secured along the sidewalls 35 so as to be disposed beneath the mouth 31 of the exit opening 32 and along a path which extends substantially horizontally across the sidewalls 35. It follows that the curvature of the arcuate rearward edge 234 substantially corresponds to the curvature of the sidewalls 35 of the cavity-defining means 27.

It is also a feature of the outlet control structure 220 that its sidewall 228 defines an opening 240 through which drainwater must pass as it flows out of the spacing 78 and enters the outlet opening 32. The opening 240 of the depicted sidewall 228 is substantially rectangular in form, but alternative shapes (e.g. circular or triangular) can be had, and the area of the opening 240 is selected to induce a relatively small amount of head pressure upstream of the outlet control structure 220. That is to say that the size, or cross-sectional area, of the opening 240 is slightly smaller than the cross-sectional area of the entrance opening 30 to effect an accumulation of drainwater upstream of the outlet control structure 220.

Preferably, the size, or cross-sectional area, of the sidewall opening 240 is selected to control the maximum treatment flow rate (MTFR) of the separator 20. In this connection, the size of the sidewall opening 240 can be said to be a function of (or dependent upon) several factors, such as the desired MTFR, the overall diameter of the collection cavity 29 of the separator 20 and the size of the entrance and exit openings 30, 32.

Because of the substantially enclosed nature of the outlet control structure 220 (save for the presence of the sidewall opening 240) and during low flow rate conditions, drainwater is prevented from entering the exit opening 52 of the separator 20 along any path other than through the sidewall opening 240. Moreover and because the outlet 240 is formed in a sidewall 228 of the structure 220 which is oriented in a plane which is disposed substantially parallel to (and spaced from) the longitudinal axis 56' of the downstream pipe segment 56, drainwater which enters the sidewall opening 240 for subsequent flow into the entrance opening 52 for eventual flow along a path which is oriented substantially parallel to the longitudinal axis 56' of the downstream pipe segment 56 must undergo an abrupt turn through ninety degrees of movement. However and because the outlet control structure 220 is open at its top, drainwater is permitted to enter the outlet opening 52 over the upper edges of the front wall 222 and sidewalls 226, 228 at higher, or storm, flow rate conditions.

Further still, the sidewall opening 240 is disposed on a side of the outlet control structure 220 which—if not for the presence of the arcuate baffle plate 60, would open toward and thereby accept drainwater flowing therein as it swirls about the central region 57 (FIG. 3) in the direction of the FIG. 3 arrows 18. However and because of the presence of the baffle plate 60, drainwater is prevented from entering the sidewall opening 240 before the drainwater first enters the cavity entrance 50 and subsequently flows along a relatively tortuous path. More specifically, drainwater which enters the cavity entrance 50 swirls through the central region 57 before passing underneath the lower edge 65 of the baffle 60 and then flowing upwardly through the boundary region 59 toward the outlet control structure 220. At the outlet control structure 220, the drainwater must enter the interior of the outlet control structure 220 by way of the sidewall opening 240 in a direction which is substantially normal to the longitudinal axis 56' and then turn through about ninety degrees of movement before entering the entrance opening 52 for subsequent flow longitudinally along the downstream pipe section 56.

The aforedescribed relative disposition between the arcuate baffle plate 60, the outlet control structure 220 and the outlet opening 52 of the separator 20 helps to ensure that the drainwater which exits the separator 30 through the downstream pipe segment 56 must follow a relatively tortuous path as it flows between the inlet and outlet openings 50, 52 of the separator 20, and such a disposition advantageously enhances the separation of course sediment and debris from drainwater flowing through the separator 20. In particular and with reference to FIGS. 8 and 9, the drainwater flowing between the inlet and outlet openings 50, 52 must travel along each of the indicated X, Y and Z coordinate directions.

It follows that a purpose served by the outlet control structure 220 is that it prevents the passage of drainwater to the mouth 31 of the outlet opening 32 unless it flows therein in a direction, indicated by the direction arrow 114 in FIG. 9, which is substantially altered from the direction of flow, indicated by the FIG. 9 flow direction arrow 112, of the drainwater which flows upwardly through the separator spacing 78 (i.e. the boundary region 57) from the lowermost region 15 of the separator cavity 29. Moreover and inasmuch as the flow of drainwater moving through the spacing 78 and toward the opening 240 of the outlet control structure 240 flows, or migrates, along a substantially vertical direction, as indicated by the FIG. 9 flow direction arrow 112, to a substantially horizontal direction, indicated by the FIG. 9 flow direction arrow 114, it can be said that the direction of flow of drainwater through the spacing 78 is altered through at least about ninety degrees. In this connection, the enhanced separation of course sediment and debris from drainwater flowing through the separator 20 is believed to be due, at least in part, to this altered direction of drainwater flow moving between the lowermost region 15 of the collection cavity 29 and the sidewall opening 240 of the outlet control structure 220.

Moreover and in conjunction with the aforedescribed (e.g. the indicated FIG. 4 counter-clockwise direction of) flow of drainwater swirling through the central region 57 of the collection cavity 29, this altered direction of flow moving through the spacing 78 has also been found to enhance the separation of sediment and debris from the drainwater flowing through the spacing 78. In addition, it is believed that the enhancement of the separation of sediment from drainwater flowing through the separator 20 is due, at least in part, to the elevation of the sidewall opening 240 above the lowest level of the mouth 31 of the outlet opening 32 and the consequential addition in the length of time that drainwater must spend in the separator cavity 29 before it is permitted to exit the cavity 29 through the outlet opening 32.

Furthermore and because the aforedescribed relationship between the outlet control structure 220 (with its sidewall opening 240) and the induced path of movement of the drainwater flowing into the separator cavity 29 by way of the inlet opening 50 enhances the separation of sediment from drainwater flowing through the separator 20, it has been found that acceptable separation characteristics can be obtained at higher flow rates of water moving through the separator 20. Accordingly, the aforedescribed features of the separator 20 are advantageous in this respect.

By way of example, the separator 20 of FIGS. 1-5 can possess an interior diameter which is within the range of between about thirty inches to about 156 inches.

It will be understood that numerous modifications and substitutions can be had to the aforedescribed embodiment 20 without departing from the spirit of the invention. For example, a separator which embodies features of the present invention and which is designed to impart a clockwise direction of movement (rather than the FIG. 4 counter-clockwise direction of movement) to drainwater which enters the collection cavity could possess a port 210 and outlet control structure 220 (with sidewall opening 240) which are mirror images to those depicted in FIG. 4 for the separator 20. Accordingly, the aforedescribed embodiment 20 is intended for the purpose of illustration and not as limitation.

The invention claimed is:

1. A gravitational separator positionable within a drainage system having an upstream pipe portion having an outlet through which drainwater enters the separator and a downstream pipe portion having an inlet through which drainwater exits the separator, the gravitational separator comprising:
a collection cavity having an interior, substantially circular sidewalls which encircle the interior, a bottom, an entrance opening through which drainwater enters the collection cavity from the upstream pipe portion, and an exit opening through which drainwater exits the collection cavity and which has a mouth and is connectable to the downstream pipe portion, and wherein the interior includes a central region within which drainwater is collected and a boundary region, and wherein the entrance and exit openings are disposed in an elevated and spaced condition above the bottom;
the collection cavity being connectable to the upstream pipe portion at such an angle with respect thereto so that drainwater which enters the collection cavity through the entrance opening thereof is directed by the upstream pipe portion substantially tangentially along the inside surface of the cavity sidewalls to impart a swirling motion to drainwater entering the central region of the collection cavity; and
a baffle supported within the collection cavity for isolating the exit opening and the boundary region of the collection cavity interior from the central region thereof and from swirling motion of drainwater being collected within the central region yet permitting drainwater to exit the collection cavity interior through the exit opening when the level of drainwater collected within the collection cavity interior reaches the level of the exit opening, and the baffle has a lower edge which is spaced from the bottom of the collection cavity and extends across the collection cavity; and
an outlet control structure positioned within the cavity interior and across the mouth of the exit opening and including a sidewall having a sidewall opening disposed to one side of the mouth of the exit opening through which drainwater which enters the mouth of the exit opening must pass so that as the drainwater enters the sidewall opening and moves into the mouth of the exit opening, the direction of flow of the drainwater is altered through at least 90 degrees.

2. The separator as defined in claim 1 wherein the outlet control structure is somewhat in the form of a rectangular prism having two opposite sidewalls which are each joined to the sidewalls of the collection cavity at locations disposed on the opposite sides of the mouth of the exit opening, a front wall which is joined to and extends between the two opposite sidewalls, and a bottom which is joined to and extends between the front wall of the outlet control structure and the sidewalls of the collection cavity at locations disposed below the exit opening of the collection cavity, and
wherein the sidewall opening is defined in one of the two sidewalls of the outlet control structure.

3. The separator as defined in claim 2 wherein the mouth of the exit opening has a lowermost edge, and the sidewall opening has a lowermost edge which is disposed above the lowermost edge of the mouth of the exit opening.

4. The separator as defined in claim 1 wherein the outlet control structure is in the form of a box having two sidewalls which are joined to the sidewalls of the cavity at locations disposed on opposite sides of the mouth of the exit opening, a front wall which is joined to and extends between the two sidewalls of the outlet control structure and a bottom which is joined to and extends between the front wall and the sidewalls of the cavity at a location disposed beneath the mouth of the exit opening.

5. The separator as defined in claim 4 wherein the outlet control structure has an open top.

6. The separator as defined in claim 1 wherein the baffle has two linear side edges which are each joined to the circular sidewalls of the collection cavity at locations disposed on opposite sides of the entrance opening thereof and which is arcuate in shape as a path is traced horizontally along the baffle between the two linear side edges thereof so that the swirling motion which is imparted to drainwater which enters the collection cavity through the entrance opening thereof is promoted by the arcuate form of the baffle.

7. The separator as defined in claim 6 wherein the lower edge of the baffle is disposed at a lower elevation than either of the entrance and exit openings of the collection cavity.

8. The separator as defined in claim 1 wherein the sidewall opening of the outlet control structure is disposed in such a relationship to the inlet opening of the collection cavity so that if not for the presence of the baffle which isolates the exit opening from the central region of the collection cavity, the sidewall opening would open toward and accept drainwater as the drainwater swirls about the central region of the cavity interior.

9. The separator as defined in claim 6 further including a vertically-disposed flow control panel of arcuate form and having a horizontally-disposed lower edge and two opposite side edges, one of the two opposite side edges of the flow control panel being joined in sealing relationship to the sidewalls of the collection cavity along a substantially vertical path adjacent the entrance opening and the other of the side edges of the flow control panel being joined in sealing relationship to the baffle along a substantially vertical path extending therealong, and the flow control panel being disposed in such a relation to the entrance opening of the collection cavity so that the lower edge of the flow control panel is disposed no lower than the vertical midpoint of the entrance opening.

10. A gravitational separator positionable within a drainage system having an upstream pipe portion having an outlet through which drainwater enters the separator and a downstream pipe portion having an inlet through which drainwater exits the separator and a longitudinal axis, the gravitational separator comprising:
 a collection cavity having an interior, substantially circular sidewalls which encircle the interior, a bottom, an entrance opening through which drainwater enters the collection cavity from the upstream pipe portion, and an exit opening through which drainwater exits the collection cavity and which has a mouth and is connectable to the downstream pipe portion, and wherein the interior includes a central region within which drainwater is collected and a boundary region, and wherein the entrance and exit openings are disposed in an elevated and spaced condition above the bottom;
 the collection cavity being connectable to the upstream pipe portion at such an angle with respect thereto so that drainwater which enters the collection cavity through the entrance opening thereof is directed by the upstream pipe portion substantially tangentially along the inside surface of the sidewalls to impart a swirling motion to the drainwater collected within the central region of the collection cavity; and
 a baffle supported within the collection cavity for isolating the exit opening and the boundary region of the collection cavity interior from the central region thereof and from swirling motion of drainwater collected within the central region yet permitting drainwater to exit the collection cavity interior through the exit opening when the level of drainwater collected within the collection cavity interior reaches the level of the exit opening, and the baffle has a lower edge which is spaced from the bottom of the collection cavity and extends substantially horizontally across the collection cavity so that as drainwater flows from the central region and into the boundary region toward the exit opening, the drainwater must pass beneath the lower edge of the baffle; and
 an outlet control structure which is positioned within the boundary region of the cavity interior and across the mouth of the exit opening and having two sidewalls which are joined to the sidewalls of the cavity at locations disposed on opposite sides of the mouth of the exit opening, a front wall which is joined to and extends between the two sidewalls of the outlet control structure and a bottom which is joined to and extends between the front wall of the outlet control structure and the sidewalls of the cavity at locations disposed beneath the mouth of the exit opening; and
 one of the sidewalls of the outlet control structure includes a sidewall opening through which drainwater which enters the mouth of the exit opening must pass so that as the drainwater enters the sidewall opening and moves into and through the mouth of the exit opening, the direction of flow of the drainwater is altered through at least 90 degrees, and wherein the sidewall opening is oriented in a plane which is spaced from and is substantially parallel to the longitudinal axis of the drainwater pipe portion.

11. The separator as defined in claim 10 wherein the mouth of the exit opening has a lowermost edge, and the sidewall opening has a lowermost edge which is disposed above the lowermost edge of the mouth of the exit opening.

12. The separator as defined in claim 10 wherein the outlet control structure has an open top.

13. The separator as defined in claim 10 wherein the baffle has two linear side edges which are each joined to the circular sidewalls of the collection cavity at locations disposed on opposite sides of the entrance opening thereof and which is arcuate in shape as a path is traced horizontally along the baffle between the two linear side edges thereof so that the swirling motion which is imparted to drainwater which enters the collection cavity through the entrance opening thereof is encouraged by the arcuate form of the baffle.

14. The separator as defined in claim 10 wherein the lower edge of the baffle is disposed at a lower elevation than the entrance and exit openings of the collection cavity.

15. The separator as defined in claim 10 wherein the sidewall opening of the outlet control structure is disposed in such a relationship to the inlet opening of the collection cavity so that if not for the presence of the baffle which isolates the exit opening from the central region of the collection cavity, the sidewall opening would open toward and accept drainwater as the drainwater swirls about the central region of the cavity interior.

16. The separator as defined in claim 10 further including a vertically-disposed flow control panel of arcuate form and having a horizontally-disposed lower edge and two opposite side edges, one of the two opposite side edges of the flow control panel being joined in sealing relationship to the sidewalls of the collection cavity along a substantially vertical path adjacent the entrance opening and the other of the side edges of the flow control panel being joined in sealing relationship to the baffle along a substantially vertical path extending therealong, and the flow control panel being disposed in such a relation to the entrance opening of the collection cavity so that the lower edge of the flow control panel is disposed no lower than the vertical midpoint of the entrance opening.

17. A gravitational separator positionable within a drainage system having an upstream pipe portion having an outlet through which drainwater enters the separator and, a downstream pipe portion having an inlet through which drainwater exits the separator and a longitudinal axis, the gravitational separator comprising:

a collection cavity having an interior, substantially circular sidewalls which encircle the interior, a bottom, an entrance opening through which drainwater enters the collection cavity from the upstream pipe portion, and an exit opening through which drainwater exits the collection cavity and which has a mouth and is connectable to the downstream pipe portion, and wherein the interior includes a central region within which drainwater is collected and a boundary region, and wherein the entrance and exit openings are disposed in an elevated and spaced condition above the bottom;

the collection cavity being connectable to the upstream pipe portion at such an angle with respect thereto so that drainwater which enters the collection cavity through the entrance opening thereof is directed by the upstream pipe portion substantially tangentially along the inside surface of the sidewalls to impart a swirling motion to the drainwater collected within the central region of the collection cavity; and a baffle supported within the collection cavity for isolating the exit opening and the boundary region of the collection cavity interior from the central region thereof and from swirling motion of drainwater collected within the central region yet permitting drainwater to exit the collection cavity interior through the exit opening when the level of drainwater collected within the collection cavity interior reaches the level of the exit opening, and the baffle has a lower edge which is spaced from the bottom of the collection cavity and extends substantially horizontally across the collection cavity so that as the drainwater moves from the central region and into the boundary region toward the exit opening, the drainwater must pass beneath the lower edge of the baffle; and wherein the baffle has two linear side edges which are each joined to the circular sidewalls of the collection cavity at locations disposed on opposite sides of the entrance opening thereof and which is arcuate in shape as a path is traced along the baffle between the two side edges so that the swirling motion which is imparted to the drainwater upon entering the collection cavity through the entrance opening thereof is promoted by the arcuate form of the baffle; and an outlet control structure which is positioned within the boundary region of the cavity interior and across the mouth of the exit opening and having two sidewalls which are joined to the sidewalls of the cavity at locations disposed on opposite sides of the mouth of the exit opening, a front wall which is joined to and extends between the two sidewalls of the outlet control structure and a bottom which is joined to and extends between the front wall of the outlet control structure and the sidewalls of the cavity at a location disposed beneath the mouth of the exit opening; and one of the sidewalls of the outlet control structure includes a sidewall opening through which drainwater which enters the mouth of the exit opening must pass so that as the drainwater enters the sidewall opening and moves into and through the mouth of the exit opening, the direction of flow of the drainwater is altered through at least 90 degrees; and wherein the sidewall opening is oriented in a plane which is spaced from and is substantially parallel to the longitudinal axis of the downstream pipe portion; and the separator further includes a vertically-disposed flow control panel of arcuate form and having a horizontally-disposed lower edge and two opposite side edges, one of the two opposite side edges of the flow control panel being joined in sealing relationship to the sidewalls of the collection cavity along a substantially vertical path adjacent the entrance opening and the other of the side edges of the flow control panel being joined in sealing relationship to the baffle along a substantially vertical path extending therealong, and the flow control panel being disposed in such a relation to the entrance opening of the collection cavity so that the lower edge of the flow control panel is disposed no lower than the vertical midpoint of the entrance opening.

18. The separator as defined in claim 17 wherein the sidewall opening of the outlet control structure is disposed in such a relationship to the inlet opening of the collection cavity so that if not for the presence of the baffle which isolates the exit opening from the central region of the collection cavity, the sidewall opening would open toward and accept drainwater as the drainwater swirls about the central region of the cavity interior.

19. The separator as defined in claim 17 wherein the mouth of the exit opening has a lowermost edge, and the sidewall opening has a lowermost edge which is disposed above the lowermost edge of the mouth of the exit opening.

20. The separator as defined in claim 17 wherein the outlet control structure has an open top.

* * * * *